United States Patent

[11] 3,633,842

| [72] | Inventor | Arthur C. Rissberger, Jr.<br>Rochester, N.Y. |
|---|---|---|
| [21] | Appl. No. | 834,702 |
| [22] | Filed | June 19, 1969 |
| [45] | Patented | Jan. 11, 1972 |
| [73] | Assignee | Eastman Kodak Company<br>Rochester, N.Y. |

[54] WEB TAKEUP DEVICE
10 Claims, 8 Drawing Figs.

[52] U.S. Cl................................................ 242/71.1
[51] Int. Cl................................................ G11b 23/10
[50] Field of Search........................................ 242/192,
195, 197, 198, 55.53, 67.1, 71.4, 71.6, 71.1

[56] References Cited
UNITED STATES PATENTS
1,609,862  12/1926  Clifford........................ 242/55.53
3,318,548  5/1967   Palmer......................... 242/192
3,348,784  10/1967  Gardiner et al............... 242/192
3,468,497  9/1969   Kelley.......................... 242/192

*Primary Examiner*—George F. Mautz
*Assistant Examiner*—Gregory A. Walters
*Attorneys*—Robert W. Hampton and John D. Husser

ABSTRACT: A takeup device is disclosed having a rotatable takeup core and a guide surface for directing the strip around the core. The core is supported with respect to the guide surface in a unique floating manner so that the core is urged towards a portion of the guide surface. As a strip is directed around the rotating core, the core facilitates feed of the strip to a cinching position and thereafter, the core floats away from the guide surface as the strip is wound onto the core.

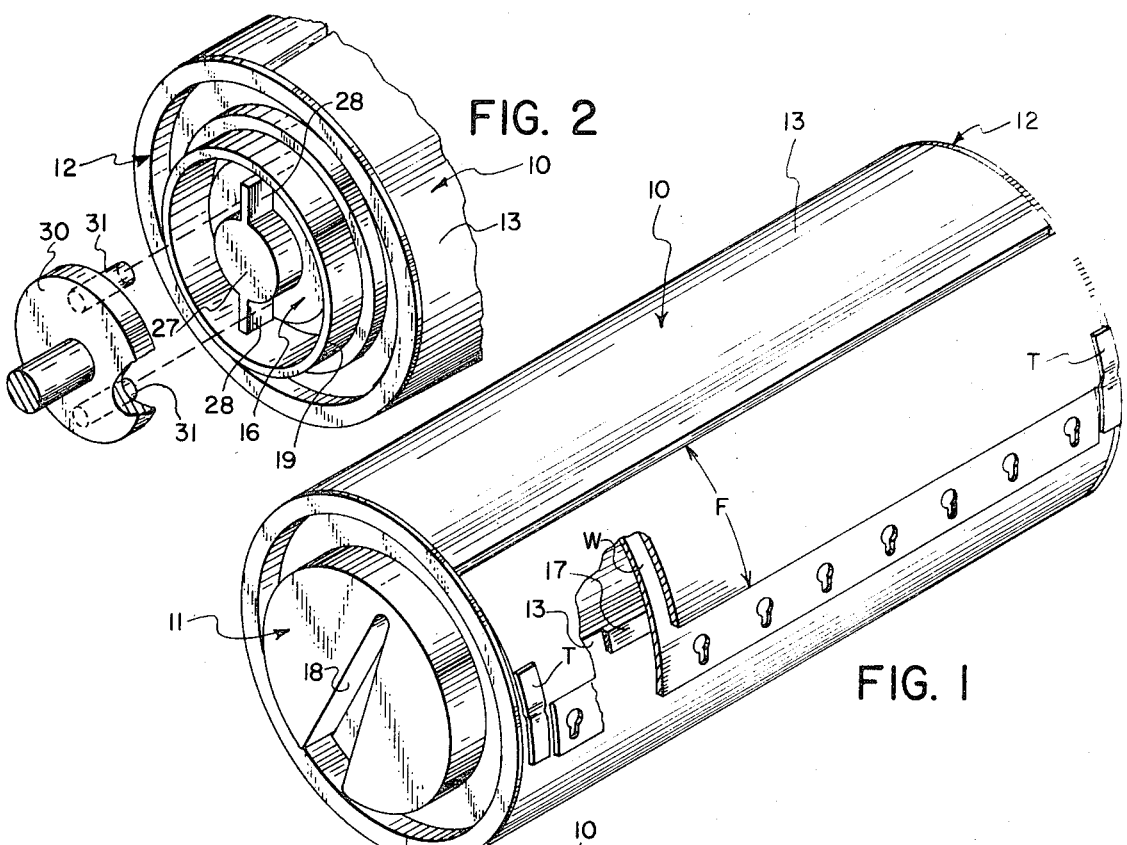
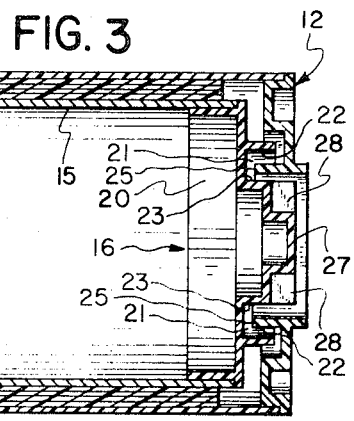
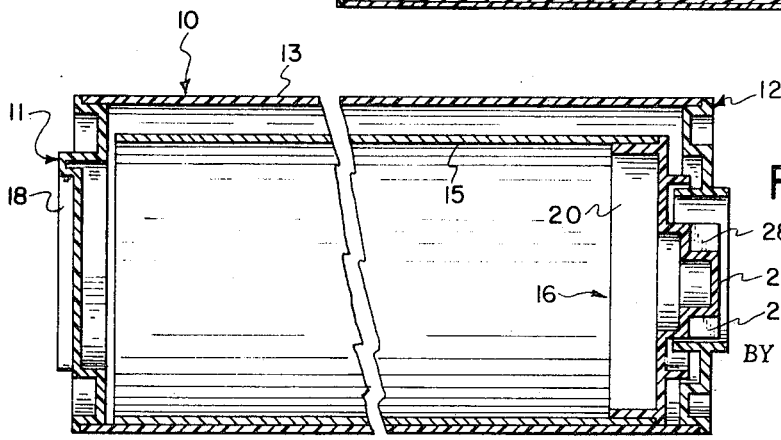
ARTHUR C. RISSBERGER JR.
INVENTOR.

PATENTED JAN 11 1972 3,633,842

ARTHUR C. RISSBERGER JR.
INVENTOR.

BY John D. Husser
R.W. Hampton
ATTORNEYS

WEB TAKEUP DEVICE

CROSS-REFERENCE TO RELATED APPLICATIONS

Reference is made to U.S. Ser. No. 834,695, filed June 19, 1969, entitled "Web Handling Apparatus and Cartridge and Web Usable Therewith," in the name of Thaddeus Swanke and U.S. Ser. No. 835,128, filed June 20, 1969, entitled "Openable Cartridge for Facilitating Egress and Ingress of Strip Material," by Clifford B. Bushnell.

BACKGROUND OF THE INVENTION

1. Field of the Invention

The present invention relates to the take up of strip material and in particular to a rotatable takeup core arrangement usable to wind strip material into cartridges.

2. Description of the Prior Art

Various cartridge constructions and feeding techniques have been utilized in the prior art in efforts to achieve reliable, self-threading attachment of a web and to a driven takeup core in a cartridge or similar structure. One approach has been to provide flexible flapper members which extend from a rotatable takeup core and include means to engage the end of the web to be taken up. A similar approach has been to provide the strip attaching structure on the takeup core surface and a guide mechanism which directs the web into proper engagement with that attaching structure.

One variety of the latter group of devices utilizes a guide structure to direct a strip around a highly frictional takeup core surface and into a self-cinching condition on the core, see for example U.S. Pat. No. 3,029,036. In order to effect this self-cinching function reliably, it is highly desirable that a pressure or guiding member be provided at a location somewhere around the takeup core in order to assure that the leading web end is held sufficiently in contact with the frictional takeup core to be moved under the following web portions, otherwise slippage can occur. These pressure or guiding members are necessarily located near the core, and it has heretofore been necessary to provide some mechanism whereby such members are movable out of their operative position after the leading portion of the web end has been cinched on the core because the diameter of the winding on the core increases rapidly with takeup. It can be appreciated that such pressure or guiding members would damage the wound material as the diameter of the coil increases unless they are moved away from the coil of material.

The provision of such movable guiding or pressure members to effect cinching creates additional costs in the manufacture of what is usually intended to be an inexpensive article. Further these movable members are subject to unreliable operation if damaged by improper handling.

SUMMARY OF THE INVENTION

It is an object of the present invention to provide an improved takeup device for web material which avoids the disadvantages of prior art devices and which will operate reliably to facilitate attachment of a web end to a takeup core.

It is a further object of the present invention to provide an improved cartridge of simplified construction for storing a length of web material.

It is another object of the present invention to provide a lighttight cartridge having a drivable takeup core of improved construction therein.

Yet another object of the present invention is to provide a disposable, light tight cartridge for supplying an unused web of electrophotosensitive material and for taking up used webs of such material for disposal.

These objectives are accomplished by the present invention, one embodiment of which in general includes a lighttight cartridge of cylindrical configuration with a cylindrical takeup core extending axially therein and adapted to be driven by means outside the cartridge. The takeup core is mounted in the cartridge in a unique floating manner whereby the core rests on or very close to one portion of the cylindrical inner surface of the cartridge when no web is in the cartridge. The outer surface of the core, or at least portion thereof, are formed of material which will exert a larger frictional force on the web than will the inner surface of the cartridge and upon rotating the core and feeding a web end into the cartridge, the web end is moved around the core and directed under a trailing portion of the web by the core and the contingent cartridge surface of the core and surface cooperating to maintain the web in contact with frictional drive surface of the rotating core. Self-cinching of the leading portion of the web onto the core is therefore effected without additional pressure members or guide structures in the cartridge and as the thickness of the coil on the core increases the core floats toward the central position in the cartridge to provide space for additional web winding.

BRIEF DESCRIPTION OF THE DRAWINGS

The above and other objects and advantages of the present invention will be apparent to one skilled in the art from the subsequent detailed description of preferred embodiments of the invention with reference to the drawings in which like numerals denote like parts and wherein:

FIG. 1 is a perspective view of a cartridge embodying the present invention and with a strip of web material stored therein;

FIG. 2 is a perspective view of the cartridge shown in FIG. 1 but showing the opposite end of the cartridge and drive means for the cartridge core;

FIG. 3 is a longitudinal cross-sectional view of the cartridge shown in FIG. 1;

FIG. 4 is a view similar to FIG. 3 but with the strip material out of the cartridge;

DETAILED DESCRIPTION OF THE PREFERRED EMBODIMENTS

Figure 5:
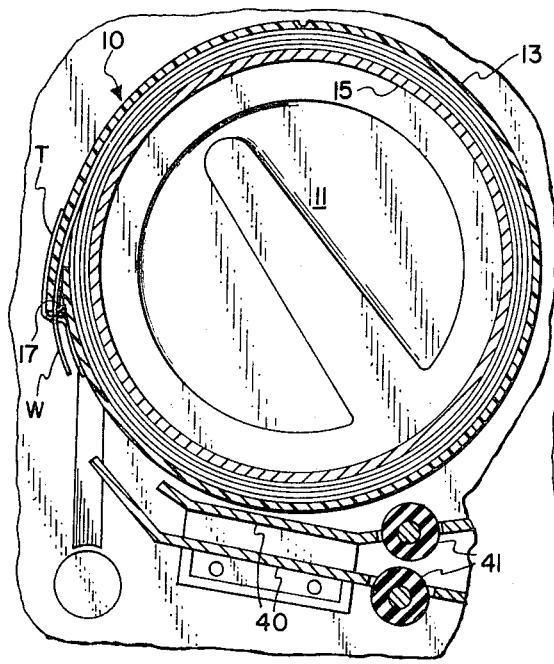
FIG. 5 is a transverse cross-sectional view of the cartridge shown in FIG. 1 mounted in an apparatus for use.

Referring to FIGS. 1 and 2 a cartridge 10 which contains a strip of web material W and has a frangible sidewall construction which facilitates the opening of the cartridge and the withdrawal and takeup of the web W is shown. The frangible sidewall construction per se does not constitute a part of the present invention, this feature forming the subject matter of copending U.S. Application Ser. No. 835,128, entitled "Openable Cartridge for Facilitating Ingress and Egress of Strip Material" filed June 20, 1969 in the name of Clifford B. Bushnell. However, the cartridge construction of the above-noted copending application is advantageously usable with the present invention, as are various other cartridge configurations.

The present invention will therefore be described as embodied in the cartridge 10 shown in FIG. 1, it being understood that it is applicable to other cartridges and strip takeup assemblies having the analogous structure for performing the functions hereinafter described. In general the structure for performing takeup in accordance with the present invention includes a rotatable core, guide structure to direct a strip around the core and a means for supporting the core with respect to the guide surface in a particular manner to be described.

Referring to FIGS. 1-3 it can be seen that the cartridge 10 has circular end walls 11 and 12 and a sidewall formed by a slightly overlapping convolution of a sheet 13, attached at its edges to the end walls 11 and 12. The cartridge 10 includes a cylindrical core 15 located inside the space defined by the cartridge walls. The core 15 is coupled at one end to a rotatable drive member 16 in end wall 12 and is adapted to support a coil of web material W wound thereon in the manner shown in FIGS. 3 and 5. After initial placement of the material W in the cartridge 10, either by winding in accordance with the present invention or by other assembly methods, the flap portion F of sheet 13 is coupled by frangible means, in this instance tabs T, to the overlapped portion of the sheet 13. It can be seen that an end of the web W is left extending between the overlapping ends of sidewall sheet 13 to the cartridge exterior in order to facilitate withdrawal of the web. A resilient retaining pad 17 extends between the overlapping portions of sheet 13 and provides retaining means for the web end therebetween and a light seal for the cartridge.

When it is desired to use the web material W in cartridge 10, the frangible tabs T are broken, for example in a manner disclosed in more detail in copending U.S. Application Ser. No. 834,695, entitled "Web Handling Apparatus and Cartridge and Web Usable Therewith," filed June 19, 1969, in the name of Thaddeus Swanke. The flap portion F is moved to the position shown in FIGS. 6-8 and the web W is completely withdrawn from the cartridge 10 for use for example in a manner disclosed in the last-mentioned copending U.S. application. It will be seen, therefore, that when in the empty condition shown in FIGS. 4 and 6, the cartridge 10 provides a rotatable core and a web guide surface such as was pointed out above as requisites for web takeup in accordance with the present invention.

One embodiment of structure for supporting such a core with respect to a guide surface in accordance with the present invention will now be described with reference to FIGS. 2-6. The cylindrical takeup core 15 of this embodiment is hollow and is press-fitted at one end onto a cylindrical flange portion 20 of drive member 16 so as to be rotatable therewith. The drive member 16 is also formed having an annular recessed portion 21 defined by opposed cylindrical surfaces 22 and 23 of the drive member. The annular recess 21 is rotatably interfitted on a cylindrical rim 25 in the end wall 12 of cartridge 10. The distance between surfaces 22 and 23 of recess 21 is such that the drive member 16 is free to float in the cartridge 10, i.e., move in a direction generally normal to its axis of rotation and the longitudinal axis of the cartridge. Because of the above-described mounting means for drive member 16, the core 15 coupled thereto is free to move between a position resting on the inner surface of the cartridge sidewall 13 such as shown in FIGS. 4 and 6 and a position more centrally located in the cartridge housing such as shown in FIGS. 3 and 5.

Referring to FIG. 2 it can be seen that the exterior portion of drive member 16 is provided with a central hub 27 having drive flanges 28 extending radially therefrom. When a rotative drive means, such as 30 shown in FIG. 2, is coupled to the drive member 16, in this instance with drive pins 31 moved into a position to contact and rotate flanges 28, the drive member 16 can be rotated about its axis and while remaining free to float in a direction normal to its rotative axis. Referring to FIG. 4, it can be seen that when the cartridge is empty, the core 15 connected to the drive member rests on the lower inner surface of cartridge wall 13 and is free to rotate on its longitudinal axis and to float in a direction normal to its rotative longitudinal axis towards a central position in the cartridge. The outer surface of the core 15, or at least portions thereof, is desirably formed of a material having a substantially higher coefficient of friction with respect to the web material than does the inner surface of the cartridge sidewall 13; however, the core 15 can rotate relatively freely on the smooth inner surface of the sidewall 13.

Figure 6:
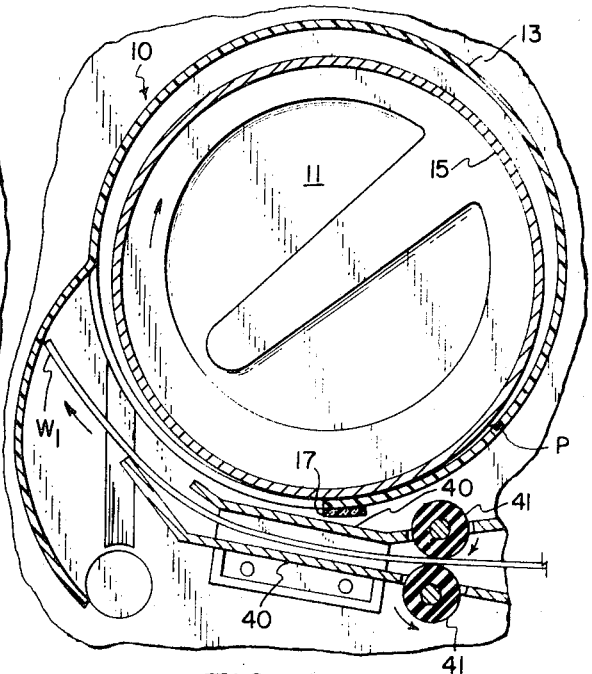
FIG. 6 is a transverse cross-sectional view of the cartridge shown in FIG. 1 showing the cartridge in an open condition with the web completely withdrawn and as the end of the web is redirected into the cartridge for takeup.

When it is desired to take up a web W into an empty cartridge 10 such as shown in FIG. 4, the cartridge is supported on suitable bearing surfaces (not shown) which interfit with portions 18 and 19 in end walls 11 and 12 respectively to locate the cartridge 10 in a position as shown in FIG. 6.

Figure 7:
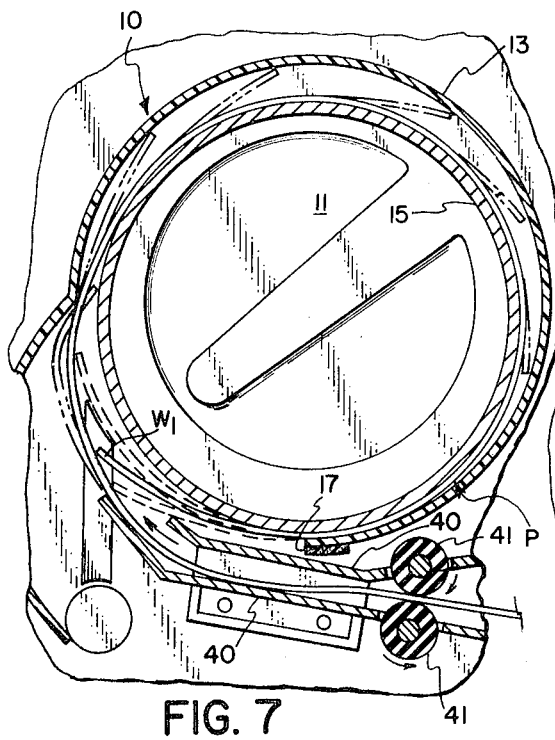
FIG. 7 is a schematic cross-sectional view similar to FIG. 6 but showing locations of a strip material fed into the cartridge during cinching on the takeup core.
Figure 8:
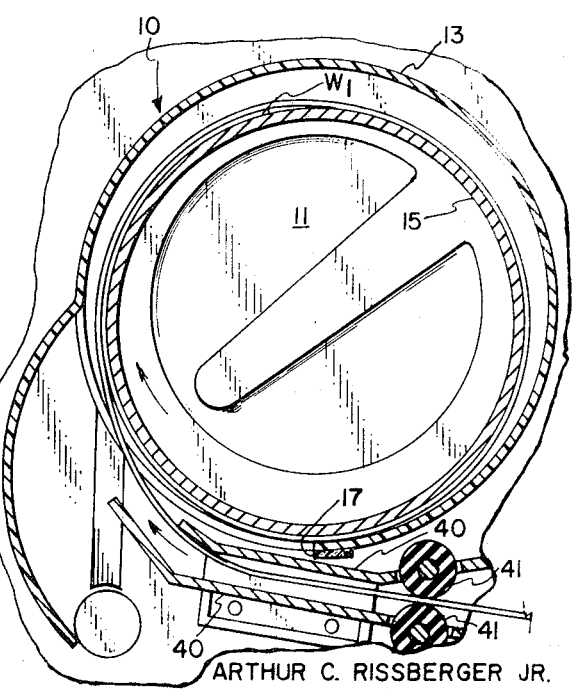
FIG. 8 is a view like FIG. 7 but showing the location of the strip material after cinching on the cartridge core has been substantially completed.

To accomplish web takeup, rotative drive means 30 is coupled to drive member 16 and rotated to move the drive member and the attached core 15 in a clockwise direction, as viewed in FIGS. 6-8. A leading end $W_1$ of web W is fed through suitable means defining a guide path into the opened cartridge, such as plate members 40 shown in FIGS. 5-8, by web drive means such as rollers 41. A detailed description of another suitable mechanism usable with the present invention to effect core rotation and feed of a web into the cartridge housing is set forth in the aforementioned copending U.S. Application of Thaddeus Swanke.

As the leading end $W_1$ of the web W is fed through guide plates 40 in the direction indicated in FIG. 6, it is guided into the interior of cartridge 10 by flap portion F of the cartridge sidewall and the guide plate 40. As the web W is progressively fed into the cartridge by rollers 41, the leading end $W_1$ is moved and directed around the rotating core 15 by the frictional outer surface of the core and the inner surface of cartridge sidewall 13 in the manner indicated in dotted lines in FIG. 7. During this stage of the takeup operation, and until the web end $W_1$ passes therebeneath, core 15 rotates in sliding contact with the lower portion of the inner surface of the sidewall 13 as shown in FIGS. 4 and 6. When the leading end $W_1$ has been moved substantially around the circumference of the core 15 to a location in the vicinity of the position P shown in FIG. 6, the weight of the core 15 is applied to the leading web end which is then between the core 15 and cartridge inner surface. The core 15 therefore is urged by gravity into contact with the web, which substantially assists the frictional transmission of the rotational movement of the core to the strip. The unique relation of the core and guide surface of the cartridge which provides increased frictional drive by the core 15 at this location is of extreme importance because when the leading end $W_1$ of strip W has reached the vicinity of position P in the cartridge, the internal forces in the web tending to urge the web to assume a straight position cause poor contact and slippage between core 15 and the leading end $W_1$ of the web. Without this unique arrangement of core and guide surface, the leading end $W_1$ would tend to remain at the position P. Since the rollers 41 are continuing to feed portions of the web into the cartridge, buckling and jamming of the web could occur unless the leading end $W_1$ continues movement around the core.

Because of the floating support for core 15 provided in accordance with the present invention, the frictional force applied by the core 15 is increased at point P by the weight of the core acting as a generally normal force between the core surface and web and the leading end $W_1$ of the web W therefore is fed on by the core 15 to the position shown in FIG. 7. Thereafter the weight of the core continues to act to improve frictional transmission of the core's rotative movement to subsequent web portions thereunder and the leading web end $W_1$ is fed under a subsequent portion of the web moving into the cartridge and on to a position where it is cinched to the core as shown in FIG. 8. In this embodiment cinching occurs after about 1¼ laps of the leading end $W_1$ around the core.

Rotation of the core 15 continues until the web is taken up into the cartridge to the extent desired and as the coil of web W on the core 15 increases in diameter, the core 15 floats upward towards a more centrally located position in the cartridge. It has been found desirable, in order to achieve a rapid cinching of the leading web end, that the peripheral speed of the core 15 be at least slightly greater than the speed of the web fed into the cartridge by rollers 41.

It will be appreciated although the present invention has been disclosed embodied in a cartridge with a takeup core, the present invention can be applied equally well to effect cinching of a web to a hub, shaft or other analogous structures on which webs can be wound. In such other embodiments, the takeup hub or shaft can be mounted for appropriate floating movement with respect to a guide surface located and constructed to direct the leading end of a strip around a major portion of the periphery of the hub or shaft. The hub or shaft is mounted in accordance with the present invention to rest on or close to the guide surface at one location around the path defined by the guide surface about the core so as to impart reliable frictional drive from the core to the web and is directed around the core in the manner described above. It will be appreciated that the core need not rest in contact with the guide surface but only sufficiently close to the guide surface to impart reliable rotative drive as the web moves to a position between the core and guide surface. Again, the hub or shaft can float away from its position near the guide surface in order to accommodate the increased diameter of the coil on the core. Still further, it will be appreciated that the cartridge disclosed herein will function equally well in apparatus which rotatably mount the core along a fixed longitudinal axis and allow or bias the outer body of the cartridge to float upon the core.

It will also be appreciated that although the disclosed embodiment of the present invention advantageously relies the force of gravity to urge the rotating takeup core into or towards contact with the web, that suitable resilient means, such as for example springs, can be utilized in addition to gravitational force if increased force is required. Also if the particular construction for takeup requires that the urged contact between core and web occur before a low point along the guided path around the core resilient means can be provided to urge intimate contact of the core and web at other points around the guide surface. When the cartridge wall is formed of sheet material as in the illustrated embodiment, such urged contact could be provided by resilient means outside the cartridge which flex the sheet material into contact with the core at desired locations. In other embodiments such spring force can be applied to the core or the core mounting at a location away from the core portion on which the web winds up so that there again is no necessity for moving any guide or pressure members away from the core after cinching, i.e., the core can float away from the guide surface against the spring force as the diameter of the coil thereon increases. Of course, if desired, the floating core described herein also can be used in conjunction with movable members biased towards the core such as are described in aforementioned U.S. Pat. No. 3,029,036.

The invention has been described in detail with particular reference to preferred embodiments thereof but it will be understood that variations and modifications can be effected within the spirit and scope of the invention.

I claim:

1. A takeup device for a strip of web material moved along a feed path, said device comprising:
   a generally cylindrical takeup member located along and having a longitudinal axis extending across said feed path;
   b. guide means, located along said feed path including means defining a strip ingress opening and a generally arcuate guide surface extending around a major portion of the circumference of said takeup member, for directing the leading end of a strip of material moved along said feed path around a substantial portion of the circumference of said takeup member; and
   c. means for supporting said takeup member for rotation about the longitudinal axis thereof and for supporting said takeup member for movement between a first position close to said guide means and a position spaced from said guide means, said support means being located so that said takeup member contacts said guide means at a position substantially around said arcuate surface from said inlet opening.

2. The invention defined in claim 1 wherein said guide means and said takeup member are located so that said takeup member is urged toward said guide means by gravity.

3. The invention defined in claim 1 further including:
   a. means for moving a strip of web material along said feed path into contact with said guide means; and
   b. means for rotating said takeup member about its axis so that the leading end of a strip feed along said guide means is moved by said takeup member between said takeup member and said guide surface and secured to said takeup member by an overlapping, trailing portion of the strip.

4. The invention defined in claim 1 wherein said takeup member is supported for floating movement on a path such that its longitudinal axis is movable away from said guide surface by increasing thickness of a coil of material formed thereon.

5. A cartridge for strip material, said cartridge comprising:
   a. a casing having means for defining a strip ingress opening and a guide surface shaped to direct a strip of material fed through said opening into a coiled configuration within said casing;
   b. a generally cylindrical core located within said casing and having a longitudinal axis, said guide surface of said casing extending substantially around said core to direct strip material therearound; and
   c. means for interconnecting said core and said casing, said interconnected core and casing being rotatable, one with respect to the other, around said core axis, said interconnecting means including means supporting said core in said casing for translatable movement of said core and casing, one with respect to the other, in directions normal to said core axis to and from a position in which said core is sufficiently close to said guide surface to contact strip material on said guide surface and positions in which said core is further spaced from said guide surface.

6. The invention defined in claim 5 wherein casing includes sidewall means defining said guide surface and said opening, and a pair of spaced end walls, at least one of said end walls having an opening therethrough, said interconnecting means including a member rotatably mounted in said opening of said end wall and coupled to said takeup core said rotatable member being adapted for connection to a source of rotary drive external of said cartridge.

7. The invention defined in claim 5 wherein said interconnecting means includes a drive member which is rotatably mounted on said casing and has a first portion within said cartridge and coupled to said core and a second portion accessible from the exterior of said cartridge and adapted to be connected to a source of rotary drive.

8. The invention defined in claim 7 wherein said drive member and said casing interfit in a substantially lighttight manner.

9. The invention defined in claim 7 wherein said drive member is mounted for movement with respect to said casing in a direction generally normal to said core axis and said second portion of said drive member includes means adapted for connection to a rotary drive source in a manner allowing translational movement of said drive member in said normal direction during rotation by such source.

10. A takeup device for a strip of web material moved along a feed path, said device comprising:
   a. a takeup member located along and having a longitudinal axis extending across said feed path;
   b. guide means, located along said feed path and including means defining a strip ingress opening and a generally arcuate guide surface extending around a major portion of the circumference of said takeup member, for directing the leading end of a strip of material moved along said feed path around a substantial portion of the circumference of said takeup member;
   c. means for supporting said takeup member for rotation about its longitudinal axis and for supporting said takeup member for movement between a first position close to said guide means and positions spaced from said guide means, said support means being constructed so that said takeup member, in said first position, is rotatable on its longitudinal axis within a distance at least slightly less than the thickness of such strip from said guide means at a location spaced around said arcuate surface from said inlet opening; and d. at least a portion of the peripheral surface of said takeup member being constructed to transmit rotative movement of said takeup member to web material contacted by such portion.

* * * * *